United States Patent Office 3,530,144
Patented Sept. 22, 1970

3,530,144
PRODUCTION OF ISOINDOLINE-2-CARBOXYLIC
ACID AMIDE
Christoph Dauth, Heinz Tönjes, and Karlheinz Heidenbluth, Radebeul, and Joachim Schmidt, Magdeburg, Germany, assignors to VEB Arzneimittelwerk Dresden, Dresden-Radebeul, Germany
No Drawing. Continuation-in-part of application Ser. No. 553,321, May 27, 1966. This application Apr. 10, 1969, Ser. No. 815,203
Int. Cl. C07d 27/48
U.S. Cl. 260—326.1
2 Claims

ABSTRACT OF THE DISCLOSURE

An o-xylylene halide of the formula

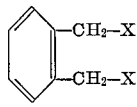

wherein X is chlorine, bromine or iodine, is reacted in acetonitrile and the reaction product is saponified to form or the reaction is conducted in an aqueous medium directly to form

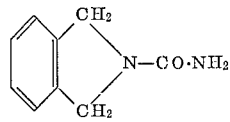

---

This application is a continuation-in-part of application Ser. No. 553,321, filed May 27, 1966, and now abandoned.

The present invention relates to the production of asymmetrical disubstituted urea derivatives and more particularly to a new and simplified method of producing isoindoline-2-carboxylic acid amide of Formula I below:

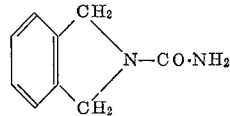 (I)

Compounds of this type were previously produced by converting the corresponding secondary cyclic amine according to the known methods for the synthesis of asymmetrical substituted urea (Houben-Weyl, vol. 8 (1952), p. 150). In particular, the isoindoline - 2 - carboxylic acid amide was produced by acid saponification of the 2-cyanoisoindoline, which in turn was obtained by splitting of the 2-allylisoindoline or 2-benzylisoindoline with cyanogen bromide (J. v. Braun, Ber. 43 (1910), pp. 1356–58). The two last mentioned compounds can be produced by the reaction of o-xylylene bromide with the corresponding allyl amine or benzyl amine.

Difficulties in the production of the starting substances and the necessity of several stages of processing made the production of the asymmetrical disubstituted urea compounds of the type of Formula I above highly uneconomical.

It is also known that open chain disubstituted urea compounds can be produced by alkylation or arylation of cyanamide or salts thereof and subsequent saponification of the obtained substituted cyanamide (W. Traube et al., Ber. 44 (1911), p. 3149). This reaction cannot, however, be used for the production of cyclic disubstituted urea compounds of Formula I above, since, for example, the reaction of o-xylylene bromide with cyanamide does not lead to the production of any definite product (J. v. Braun, Ber. 46 (1913), p. 1790).

It is accordingly a primary object of the present invention to provide a simple method of producing isoindoline-2 carboxylic acid amide of Formula I above in a single-stage process and in high yields.

It is another object of the present invention to provide a general method of producing isoindoline-2-carboxylic acid amine in a simple manner and in high yield and with a high degree of purity.

Other objects and advantages of the present invention will be apparent from a further reading of the specification and of the appended claims.

With the above and other objects in view, the present invention mainly comprises the reaction of an o-xylylene halide of general Formula II below:

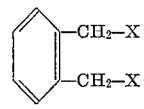 (II)

wherein X is chlorine, bromine or iodine, with technically pure or prepurified calcium cyanamide or sodiumhydrogencyanamide or cyanamide, in water or in mixtures of water with water-soluble organic solvents such as methanol, ethanol, acetone, dioxane, and the like, or in a hydroxyl group-free organic solvent such as acetonitrile with subsequent saponification of the organic reaction product with dilute sodium hydroxide or the like; if necessary the reaction is carried out with the addition of an inorganic alkaline reagent such as sodium hydroxide, potassium hydroxide, sodium carbonate, potassium carbonate, sodium bicarbonate, potassium bicarbonate or the like. The time for the reaction in a hydroxyl group-free organic solvent such as acetonitrile is about 5 to about 10 hours and the reaction temperature is about 60 to about 85° C., preferably about 75 to about 85° C. The time for the reaction in an aqueous medium varies within rather wide limits of, for example, about 1 to about 48 hours at a reaction temperature of from about 40 to about 100° C.; the preferred reaction temperature is about 80 to about 90° C.

It has been found that by proceeding in the above single-stage process, i.e., in aqueous medium the compound of Formula I is obtained in relatively high purity in yields of up to about 60% of the theoretical.

The method of the present invention is further characterized by the possibility of working with technical calcium cyanamide which, after removal from the reaction solution of the present insoluble constituents of the calcium cyanamide, is extracted two to three times with a suitable solvent, such as water, and the desired product is isolated from the reaction solution combined with the extracts in normal manner and purified by recrystallization.

The following examples are given to further illustrate the method of producing asymmetrical disubstituted urea compounds according to the present invention. The scope of the invention is not, however, meant to be limited to the specific details of the examples.

EXAMPLE 1

0.17 mol of o-xylylene chloride, 0.35 mol of calcium cyanamide, technical crude form, and 0.35 mol of potassium carbonate are mixed with 350 ml. of water and the heterogeneous mixture is intensively stirred for 5 hours at 85–90° C. The insoluble residue of the calcium cyanamide that remains atfer hot suction filtration is leached out 2 to 3 times, each time with 150 cc. of boiling water and put away for crystallization with the combined extracts of the reaction solution. After the separation of the light crystals, the filtrate is concentrated to about one-fifth of its volume under vacuum, and put away for crystallization. The combined crystalline product is recrystallized from ethanol. The melting point of the resulting isoindoline-2-carboxylic acid amide is 184–186° C.

EXAMPLE 2

0.17 mol of o-xylylene chloride, 0.17 mol of calcium cyanamide in technical crude form and 0.35 mol of sodium hydroxide are mixed with 350 ml. of water and the heterogenous mixture is intensively stirred for 5 hours at 80–85° C. The further working up proceeds as in Example 1.

EXAMPLE 3

0.17 mol of o-xylylene chloride, 0.35 mol of calcium cyanamide in crude technical form and 0.35 mol of potassium carbonate are mixed with 150 ml. of water and 200 ml. of ethanol, and the heterogeneous mixture is intensively stirred for 48 hours at 40° C. The ethanol is then distilled off, replaced by water, and the stirring is continued for an additional 5 hours at 85° C. The further working up proceeds as in Example 1.

EXAMPLE 4

0.17 mol of calcium cyanamide in crude technical form are suspended in 90 ml. of water, 0.35 mol of sodium hydroxide dissolved in 210 ml. of water, and 0.17 mol of o-xylylene chloride dissolved in 225 ml. of methanol are added. The heterogeneous mixture is intensively stirred under refluxing during the course of 10 hours. The methanol is distilled off and the remaining suspension further worked up as described in Example 1.

EXAMPLE 5

0.35 mol of technical crude calcium cyanamide are suspended in 180 ml. of water and mixed with 0.70 mol of sodium hydroxide dissolved in 530 ml. of water. After 30 minutes, 0.35 mol of o-xylylene chloride dissolved in 450 ml. of dioxane are added thereto, and the heterogeneous mixture is intensively stirred under refluxing for 18 hours. After separating off of the insoluble constituents of the calcium cyanamide, the filtrate is concentrated and the resulting isoindoline-2-carboxylic acid amide which is obtained by suction filtration is recrystallized from ethanol.

EXAMPLE 6

0.17 mol of o-xylylene chloride, 0.35 mol of calcium cyanamide in crude technical form and 0.35 mol of sodium carbonate are mixed with 350 ml. of water and the heterogeneous mixture is intensively stirred for 5 hours at 80–90° C. The further working up proceeds as in Example 1.

EXAMPLE 7

0.17 mol of o-xylylene chloride, 175 ml. of a 6% cyanamide liquor (0.25 mol cyanamide) and 0.35 mol of sodium hydroxide dissolved in 175 ml. of water are mixed together and intensively stirred for 5 hours at 85° C. The isoindoline-2-carboxylic acid amide is isolated by boiling extraction (three times) of the organic residue, each time with 150 ml. of water, and is then recrystallized from ethanol.

EXAMPLE 8

0.35 mol of crude technical calcium cyanamide are suspended in 200 ml. of water and mixed with 0.35 mol of o-xylylene chloride dissolved in 450 ml. of ethanol. The heterogeneous mixture is intensively stirred for 18 hours at the boiling point, the ethanol is distilled off and the residue is further worked up as described in Example 7.

EXAMPLE 9

0.17 mol of o-xylylene bromide, 0.35 mol of calcium cyanamide in crude technical form and 0.35 mol of potassium carbonate are mixed with 350 ml. of water, and the heterogeneous mixture is intensively stirred for 5 hours at 85–90° C. Further working up proceeds as in Example 1.

EXAMPLE 10

0.70 mol of o-xylylene bromide, 0.70 mol of calcium cyanamide in crude technical form, 1.40 mol of sodium hydroxide dissolved in 1050 ml. of water, and 900 ml. of ethanol are intensively stirred under refluxing for 18 hours. After suction filtration the volume is concentrated to one-fifth of the original, and the residue is further worked up as described in Example 7.

EXAMPLE 11

0.085 mol of o-xylylene iodide, 0.17 mol of calcium cyanamide in crude technical form and 0.17 mol of potassium carbonate are mixed with 175 ml. of water and intensively stirred for 5 hours at 85° C. Further working up proceeds as in Example 1.

EXAMPLE 12

0.085 mol of o-xylylene bromide and 0.17 mol of sodium hydrogen cyanamide are vigorously stirred under refluxing in 100 ml. of acetonitrile and in the course of 7 hours brought to reaction thereby. After removal of the precipitated sodium bromide, the filtrate is concentrated and the residue is saponified with 175 ml. of 4% sodium hydroxide for 1 hour at 85° C. The resulting isoindoline-2-carboxylic acid amide is isolated by aqueous extraction and is then recrystallized from ethanol.

The unsymmetrical disubstituted urea compounds produced according to the method of the invention exhibit interesting pharmacological properties.

TABLE 1.—PHARMACOLOGICAL DATA OF ISOINDOLINE-2-CARBOXYLIC ACID AMIDE

| | Compound | | |
| --- | --- | --- | --- |
| | Isoindoline-2-carboxylic acid amide | 1,2-diphenyl-4-n-butyl-pyrrazolidin-3,5-dione | Morphine hydrochloride |
| Acute toxic dose mice, mg./kg. | 580 | 270 | 370 |
| Analgesic activity method ED50, mice mg./kg. i.p.: | | | |
| El. tail irritation | 66 | 208 | 9 |
| Focal ray | 68 | 250 | 5 |
| Hot plate | 35 | 140 | 16 |
| Anti-inflammatory activity, mg./kg. inhibition i.p. of Kaoline-dema, percent: | | | |
| 100 | 56 | 52 | (—) |
| 20 | 46 | 31 | (—) |
| 5 | 10 | | (—) |

What I claim is:

1. A method which comprises reacting in acetonitrile and at a temperature of about 60 to about 85° C. and for a period of about 5 to about 10 hours an o-xylylene halide of the formula

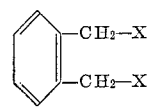

wherein X is chlorine, bromine or iodine, with sodium hydrogen cyanamide and treating the reaction product with sodium hydroxide so as to form

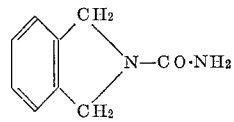

2. A method which comprises reacting in a medium consisting of water, aqueous methanol, aqueous ethanol, aqueous acetone or aqueous dioxane and also containing sodium or potassium hydroxide, carbonate or bicarbonate and at a temperature of about 40 to about 100° C. and for a period of about 1 to about 48 hours an o-xylylene halide of the formula
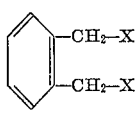
wherein X is chlorine, bromine or iodine, with calcium cyanamide, sodium hydrogen cyanamide or cyanamide whereby the reaction product is saponified in situ so as to form
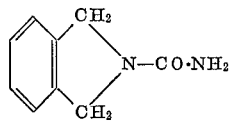
References Cited
Braun: Ber. 43 (1910), pp. 1356–58.
Traube et al.: Ber. 44 (1911), pp. 3149–50.
ALEX MAZEL, Primary Examiner
J. A. NARCAVAGE, Assistant Examiner
U.S. Cl. X.R.
260—999